United States Patent [19]
Zanoni et al.

[11] 3,734,124
[45] May 22, 1973

[54] STAGED THROTTLING FLOAT VALVE

[75] Inventors: Paul Zanoni, Muskegon; Richard F. Shunta, Muskegon Heights, both of Mich.

[73] Assignee: Bennett Pump Incorporated, Muskegon, Mich.

[22] Filed: July 19, 1971

[21] Appl. No.: 163,859

[52] U.S. Cl. ................................137/430, 251/122
[51] Int. Cl. ..............................................F16k 31/18
[58] Field of Search....................137/429, 430, 432, 137/433, 411, 434, 438, 442, 444, 630.14, 630.15; 251/118, 120, 122

[56] References Cited
UNITED STATES PATENTS

| | | | |
|---|---|---|---|
| 3,593,740 | 7/1971 | Harrison et al. | 137/434 |
| 1,298,849 | 1/1919 | Wolff | 137/630.15 |
| 1,464,286 | 8/1923 | Lundblad | 137/630.15 |
| 1,817,379 | 8/1931 | Kallmeyer | 137/411 |
| 3,011,515 | 12/1961 | Kravagna | 137/411 |

Primary Examiner—Martin P. Schwadron
Assistant Examiner—David R. Matthews
Attorney—Thomas M. Marshall

[57] ABSTRACT

A throttling mechanism to be embodied as part of a float valve for controlling the flow through an orifice includes a stem portion having concentrically mounted thereon a primary throttling valve mechanism and a secondary throttling valve mechanism. As the buoyancy force of the float is increased, the primary valve opens to allow flow through the orifice to stabilize the position of the float valve. Additional buoyancy force acting on the float will cause the secondary throttling valve to open thereby enabling increased flow through the orifice. Under conditions of varying pressure differential, the float valve will tend to bob up and down adjusting the total flow area as required, to maintain a constant liquid level.

4 Claims, 4 Drawing Figures

PATENTED MAY 22 1973

INVENTORS
PAUL ZANONI
RICHARD F. SHUNTA

BY

*Thomas M. Marshall*
ATTORNEY

STAGED THROTTLING FLOAT VALVE

The present invention relates to a multi-phase valve to be embodied in a float valve, and more particularly, a staged throttling float valve, including a primary stage and a secondary stage to more efficiently control and throttle the flow through an aperture or orifice.

U.S. patent application Ser. No. 128,291 entitled, "Compact Pump/Air Separator Apparatus" by Paul Zanoni, the inventor of the subject application, which was filed on Mar. 26, 1971, discloses a combination pump and air separator apparatus which employs a float valve to control the recycling of gasoline from an atmospheric chamber into the inlet portion or inlet side of the gasoline pump forming a portion of the compact pump/air separator apparatus. As indicated in the above-identified application, the float valve must perform two functions, the first of which is to completely seal the orifice leading from the atmospheric chamber to the inlet side of the pump. The second requirement of the float valve is to regulate the gasoline level in the atmospheric chamber by providing a throttling action which is controlled by the position of the float. One of the problems associated with the operation of the float valve is the differential pressure existing on opposite sides of the orifice. In the case of the compact pump/air separator the float valve is located in a chamber which is vented to the atmosphere and in communication with a source of suction, where the orifice connects said chamber with a second chamber wherein the pump is located. Accordingly, the pressure in said second chamber is normally less than the pressure in the first chamber. It thus follows that, preferably, the operation of the float valve should compensate for the existing pressure differential by adjusting the flow area through the orifice to maintain a constant liquid level in the first chamber.

It is in an application such as the compact pump/air separator apparatus that the subject invention is intended to be embodied. Although the compact pump/air separator apparatus is specifically disclosed with reference to a gasoline pumping system, the subject staged float valve may be employed in any application where it is desired to accurately and controllably throttle the flow of fluid through an orifice and thereby maintain a constant liquid level.

In general, a valve controlled by a float has only a limited amount of force available to overcome the pressure differential existing when the valve is in the closed position. The usual method of providing sufficient force is to provide levers and a large float area at the liquid level. However, this has the inherent disadvantage in that it requires a great deal of space within the chamber or container in which the float is contained, and it is sometimes difficult to locate the valve in a position within the chamber so as to avoid the formation of a vortex when the valve is opened. This problem is additionally complicated in those applications where the float valve is required to operate under conditions of varying pressure differentials.

Accordingly, it is an object of this invention to provide a staged throttling float valve for regulating the liquid level in a container by throttling the passage of fluid through a valve controlled by a direct acting float.

It is another object of this invention to provide a staged throttling float valve including a plurality of stages to more accurately control the flow of fluid through the associated orifice.

It is a further object of this invention to provide a staged throttling float valve which does not require either levers or a large float area at the liquid surface in order to provide sufficient force for the actuation of the valve.

It is still a further object of this invention to provide an improved staged throttling float valve which is relatively compact in size in order to enable the valve to be located at various positions within the container.

It is still another object of this invention to provide a staged throttling float valve which responds to varying pressure differentials existing in the vicinity of the orifice, by providing more (or less) area for flow and thereby compensating for the decreased (or increased) flow caused by a decrease (or increase) in pressure differential.

These and other objects and advantages of the invention will become more apparent upon a reading of the following description and drawings in which.

Figure 1:
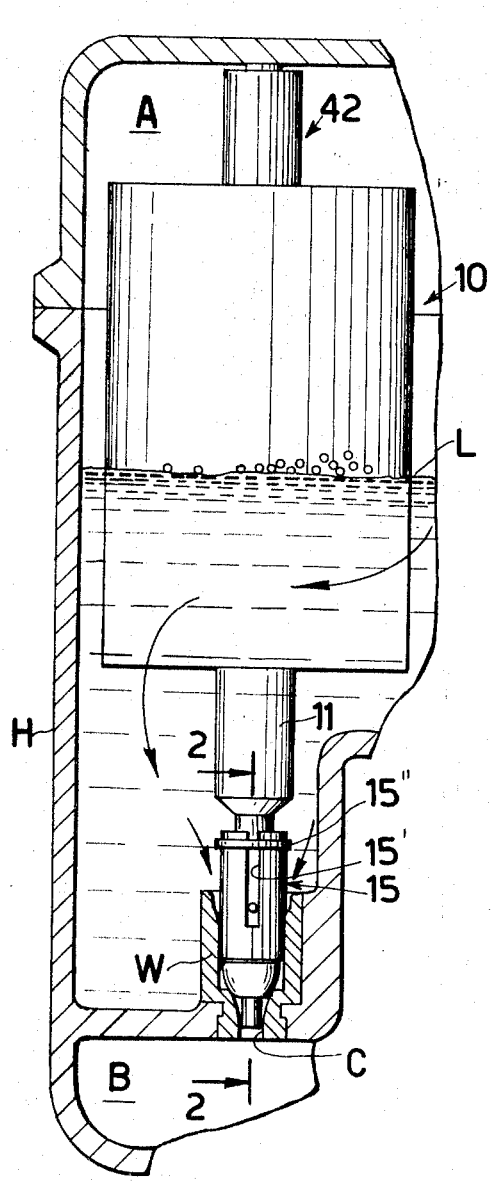
FIG. 1 illustrates a partial sectional view of an apparatus in which the staged float valve of the subject invention may be embodied.

Referring to FIG. 1, a partial sectional view of a compact pump/air separator apparatus as described in U.S. application Ser. No. 128,291, as identified above, is shown as including a housing H., including an atmospheric chamber A, shown partially in section, and a second chamber B, with chambers A and B being interconnected by an orifice C that is controlled by a float valve, generally indicated by numeral 10. As illustrated, the float valve 10 is adapted to move along a vertical axis in response to the level of the liquid, designated by L, contained in chamber A. The float valve 10 is confined to transitional movement by (1) cooperation of the valve stem 11 with an internal annular wall W of the housing; and (2) a guide mechanism, generally indicated by the numeral 42, which is suitably connected to the upper end of the float valve 10.

Figure 2:
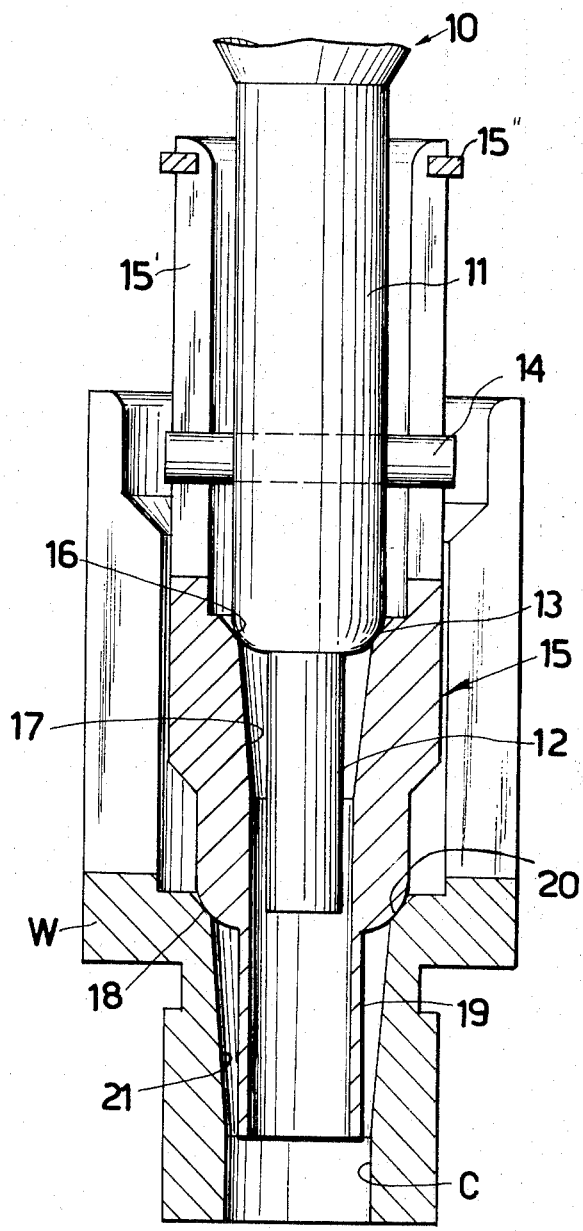
FIG. 2 is a sectional view taken along lines 2—2 in FIG. 1, and illustrating the staged float valve of the subject invention in its fully closed position.

FIG. 2 illustrates the throttling portion of the staged float valve of the subject invention, which throttling portion includes a primary throttle valve and a secondary throttle valve concentrically mounted to the lower end of stem 11. The primary throttling valve comprises a primary throttling pin 12 which is connected to float stem 11 and is axially aligned therewith. The primary throttling pin 12 is of a smaller diameter than valve stem 11, and the transition portion between members 11 and 12 defines a spherical valve 13, to be more fully discussed hereinafter. Extending transverse to the float stem 11 is a pin 14 which is slidably received in a pin guide 15' formed in a concentric annular member 15 that is movable along a vertical axis within the confines of the annular wall W of the housing H. As they are more fully discussed hereinafter, the annular member 15 is biased by the pressure forces existing in the immediate vicinity of orifice C in its downwardmost position, as shown in FIG. 2, and is moved from this downward position upon vertical displacement of the valve stem 11 whereby at a point in its vertical movement, the pin 14 engages a stop ring 15'' disposed about the periphery of the upper end of annular member 15. The internal diameter of the annular member 15 decreases from top to bottom, with the internal conical concave transition region defining the primary valve seat 16 for primary spherical valve 13. Below the primary valve seat 16, the internal wall of annular member 15 is tapered to define the primary throttling taper 17 which cooperates with the primary throttle pin 12 to define a variable sized opening for the passage of liquid L from chamber A to chamber B through orifice C.

The lower cylindrical end of the annular member 15 defines a secondary throttle pin 19 which cooperates with the tapered internal surface 21 of wall W. to form a secondary throttling valve for the passge of liquid L from chamber A to chamber B through orifice C. Immediately above the secondary throttling pin 19, the external surface of annular member 15 defines a secondary spherical valve 18 which cooperates with a conical secondary valve seat 20 formed on the internal surface of annular wall W.

Figure 3:
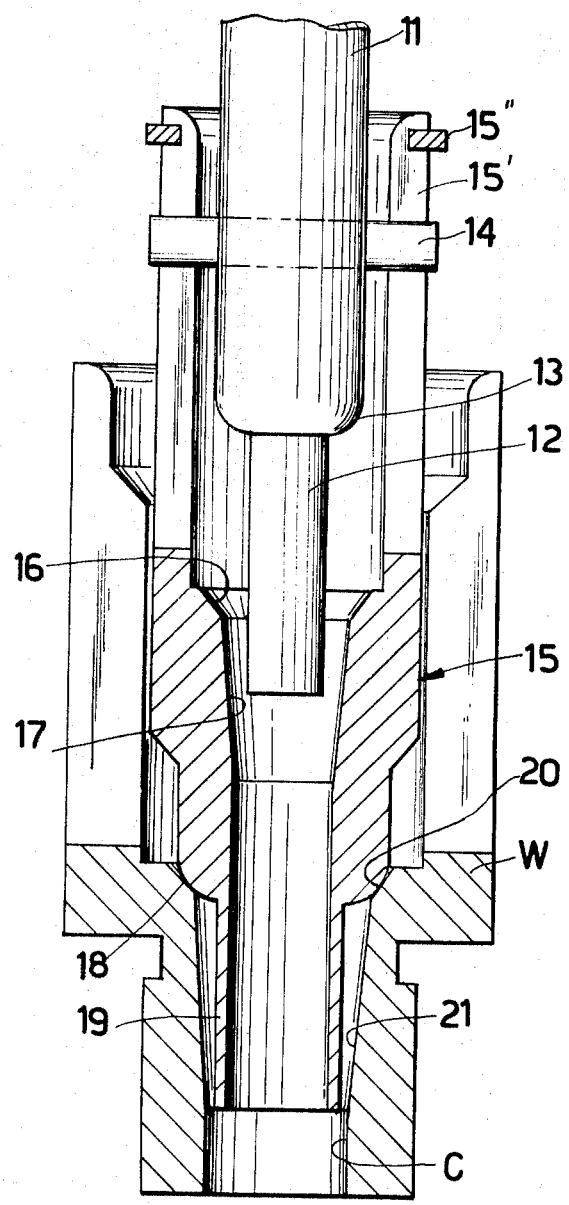
FIG. 3 is a view of the staged float valve similar to FIG. 2 and illustrating the staged float valve in a partial open position wherein the primary throttling valve is partially open.

The operation of the stage float valve of the subject invention will now be described with reference to FIGS. 2, 3 and 4. In general, the buoyancy force of the float is balanced by its weight, along with the differential pressure forces on the valves. In the closed position, as illustrated in FIG. 2, high pressure forces act across the entire area of both seats. More particularly, a differential pressure force exists on opposite sides of the primary and secondary valves, with the higher pressure being located above the valves. As the liquid level in chamber A arises, the buoyancy force on the float will increase until it is sufficient to overcome the pressure forces on the primary valve 13. At such time, the valve stem 11 will lift so as to open the primary valve 13, 16 to allow flow of liquid L to occur in the passageway defined between the primary throttling pin 12 and the primary throttling taper 17. As the valve stem 11, and accordingly the primary throttling pin 12, rises the area of the passageway available for liquid flow increases and the primary valve will assume a position where the flow out of the chamber A through the orifice C equals the flow of fluid into the chamber A, assuming the area of the annular passageway between pin 12 and taper 17 is sufficient. The float will remain stationary in this position. It is noted that the area of the annular passageway defined by pin 12 and throttling taper 17 must be less than the area of the passageway at the bottom of the taper so that the pressure drop occurs at the former point. The pressure acts only on the end of the throttling pin 12 and remains constant regardless of the position of the pin in the primary throttling taper 17. Therefore, the float will follow the liquid surface, allowing more liquid to leave if the liquid level rises, and correspondingly less liquid to leave if the level falls.

Figure 4:
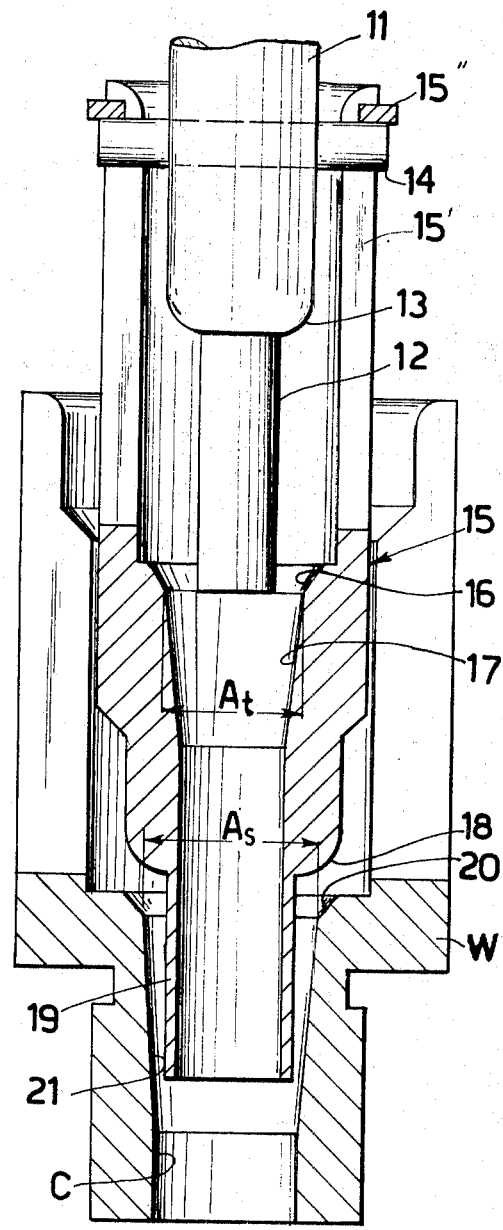
FIG. 4 is a view similar to FIG. 2 and illustrating the primary throttling valve in its fully opened position and the secondary throttling valve partially open.

Referring to FIG. 4, if the liquid level in cavity A continues to rise after the pin 12 reaches the top of the primary throttling taper 17, the lifting pin 14 will bear against the washer 15'' in the pin guide slot 15' to exert a force and lift the secondary valve. When the stage float valve is in this position, the pressure force on secondary valve is due to the difference between the area across the secondary seat, designated by $A_s$, and the area at the top of the primary taper designated by $A_t$. This difference can be quite small if the valve is made to close tolerances.

A rise in the liquid level will readily produce a buoyancy force sufficient to overcome the above mentioned pressure force and lift the secondary valve from its seat. Pressure forces will now act on the annular area of the secondary throttling pin 19 in addition to the area of the primary pin 12. Both of these forces will remain constant as the secondary pin moves up the secondary throttling taper 21 so as to regulate the liquid level as before, but with a greater area available for the flow of liquid than existed previously when only the primary pin and taper defined a passageway for the liquid.

It is noted that if the stage float valve was operating in the throttling position with the secondary valve closed and the primary valve open, and the pressure difference was suddenly decreased (e.g. by a rise in pressure below the valve), the pressure force on the end of the primary throttling pin 12 would decrease. This would result in the float being bobbed or jerked upwardly, thereby lifting the intermediate seat and exposing a greater area for the flow of liquid. However, the flow does not increase proportionately because of the decrease pressure differential. It is noted that under conditions of varying pressure differential, the valve tends to bob up and down adjusting the flow area as required, as the liquid level and flow remain constant.

What is claimed is:

1. A staged throttling float valve for controlling the flow of liquid through an orifice comprising:
   a float having a depending stem;
   an annular member concentrically mounted to the lower end of said stem, said annular member being slidable relative to said stem along the axial length thereof, said annular member being connected by a pin to said stem, with the extremities of said pin being slidably received in elongated slots formed in said annular member, said slots being axially aligned with the longitudinal axis of said annular member;
   a first variable area valve defined between the lower extremity of said stem and the internal surface of said annular member; and
   a second variable area valve defined by the lower extremity of said annular member and the internal surface of said orifice.

2. A staged throttling float valve as in claim 1 wherein the lower end of said stem includes a spherically shaped valve portion and a constant diameter pin portion, and the internal surface of said annular member includes a cooperating, conical shaped seat portion and a tapered internal wall portion.

3. A staged throttling float valve as in claim 1 wherein said annular member includes a stop means adjacent the upper end thereof.

4. A staged throttling float valve as in claim 1 wherein the lower extremity of said annular member is spherically shaped to cooperate with the internal surface of said orifice which is conically shaped.

* * * * *